(12) United States Patent
Ebuchi et al.

(10) Patent No.: US 7,397,268 B2
(45) Date of Patent: Jul. 8, 2008

(54) RECEIVER CIRCUIT

(75) Inventors: Tsuyoshi Ebuchi, Osaka (JP); Toru Iwata, Osaka (JP); Takefumi Yoshikawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/653,340

(22) Filed: Jan. 16, 2007

(65) Prior Publication Data

US 2007/0115025 A1 May 24, 2007

Related U.S. Application Data

(63) Continuation of application No. 10/716,615, filed on Nov. 20, 2003, now Pat. No. 7,176,708.

(30) Foreign Application Priority Data

Nov. 28, 2002 (JP) ............................. 2002-346153

(51) Int. Cl.
*H03K 19/007* (2006.01)
(52) U.S. Cl. ............................................ 326/14; 326/9
(58) Field of Classification Search .................. 326/9, 326/14; 375/360
See application file for complete search history.

(56) References Cited

U.S. PATENT DOCUMENTS 4,446,437 A    5/1984    Rinaldi 5,301,171 A    4/1994    Blow et al.
6,320,406 B1   11/2001   Morgan et al.
6,781,456 B2 * 8/2004    Pradhan ........................ 330/69

FOREIGN PATENT DOCUMENTS

| JP | 61-193541 | 8/1986 |
| JP | 05-037573 | 2/1993 |
| JP | 10-200450 | 7/1998 |
| JP | 2001-237681 | 8/2001 |

OTHER PUBLICATIONS

Japanese Office Action, with English Translation, issued in corresponding Japanese Patent Application No. JP 2002-346153, mailed on Jan. 29, 2008.

\* cited by examiner

*Primary Examiner*—James H. Cho
(74) *Attorney, Agent, or Firm*—McDermott Will & Emery LLP

(57) ABSTRACT

In a receiver circuit that receives data and clock signals through the cables, the number of transitions of a signal obtained based on the data or clock signal is detected by a frequency detection circuit, and when the number of transitions is not more than a predetermined set value, a signal for resetting the operation of a serial-parallel converter circuit included in a data processing unit is output, so as to control the output of received data. Thus, disconnection of the cable can be detected with low power consumption without providing a pull-up resistor and pull-down resistor and noise resistance can be improved.

9 Claims, 7 Drawing Sheets

RECEIVER CIRCUIT

RELATED APPLICATION

This application is a continuation of Application Ser. No. 10/716,615, filed Nov. 20, 2003, now U.S. Pat. No. 7,176,708, which claims priority to JP 2002-346153 filed on Nov. 28, 2002; which are all incorporated herein by reference.

BACKGROUND OF THE INVENTION

The present invention relates to a receiver circuit, and more particularly, it relates to a receiver circuit suitably used for detecting, with low power consumption, a cable having come off in a data transfer system using the cable.

In general, in a data transfer system using a cable such as LVDS (Low Voltage Differential Signaling), a receiver circuit should have a function to detect a cable having come off and to fix the data output to a HIGH or LOW level in accordance with the current status of the system, and this function is designated as a fail safe function.

A conventional receiver circuit for realizing the fail safe function is shown in FIG. 6. This receiver circuit includes a data processing unit 1000 and a clock processing unit 2000.

The data processing unit 1000 includes an input buffer 1 and a 1:7 serial-parallel converter circuit 2 for converting a serial output signal RDATA of the input buffer 1 into parallel data in 7-bit groups and outputting the parallel data. A terminating resistor RT1 is connected between positive and negative input terminals RDP and RDM of the input buffer 1 for accepting differential data signals with small amplitude, a pull-up resistor RP1 is connected between the positive input terminal RDP and a power source VDD, and a pull-down resistor RP2 is connected between the negative input terminal RDM and a power source VSS.

The clock processing unit 2000 includes an input buffer 3 and a multiphase PLL circuit 4 for controlling the frequency and the phase of an output signal RCLOCK of the input buffer 3. The positive and negative input terminals INP and INM of the input buffer 3 for accepting differential clock signals with small amplitude are connected to a terminating resistor RT2, a pull-up resistor RP3 and a pull-down resistor RP4 in the same manner as in the input buffer 1 of the data processing unit 1000.

In this receiver circuit, the pull-up resistors RP1 and RP3 and the pull-down resistors RP2 and RP4 are used for realizing the fail safe function. When a cable has come off and is disconnected, for example, in the data processing unit 1000, a current passes through the three resistors, namely, the pull-up resistor RP1, the terminating resistor RT1 and the pull-down resistor RP2, and IR drop occurring in the terminating resistor RT1 is detected by the input buffer 1, so that the output level of the 1:7 serial-parallel converter circuit 2 can be fixed to a HIGH or LOW level. In this case, the terminating resistor RT1 is set to 100 Ω according to the LVDS standard.

In assuming, for example, that RP1=RP2=20 kΩ, RT1=100 Ω, VDD=3.3 V and VSS=0 V, a current, 3.3V/40.1 kΩ=82 uA, passes through the three resistors RP1, RT1 and RP2, and hence, a potential difference, 82 uA×100 Ω=8.2 mV, is caused in the terminating resistor RT1.

In the aforementioned conventional architecture, however, even in the case where the cable is normally connected and hence the fail safe function is not exhibited, a current steadily passes through the pull-up resistor RP1, the terminating resistor RT1 and the pull-down resistor RP2, which wastefully consumes power. In particular, when the number of data channels (i.e., the number of data processing units) is increased, the steady-state current increases in proportion to the number of data channels, and therefore, the wasteful power consumption is further increased.

In order to overcome this problem, when, for example, the pull-up resistor RP1 and the pull-down resistor RP2 are set to a larger value for reducing the current consumption, although the steady-state current passing through these resistors can be reduced, voltage drop caused in the terminating resistor RT1 is also reduced, resulting in increasing possibility of error detection of noise on the input data line.

As a result, noise resistance is lowered when the fail safe function is exhibited. Thus, the conventional architecture is not preferable.

SUMMARY OF THE INVENTION

The present invention was devised to overcome the aforementioned conventional problem, and an object of the invention is, in a receiver circuit, detecting, with low power consumption, a state where a cable has come off and is disconnected.

In order to achieve the object, according to the invention, the pull-up resistors and the pull-down resistors are removed from the data signal input terminal and the clock input terminal, and the number of transitions or the amplitude of a data signal or a clock signal is detected, so that the state where a cable has come off can be detected on the basis of the number of transitions or the amplitude.

Specifically, the receiver circuit of this invention for receiving a receive signal that undergoes a given number or more transitions in a given time, includes a processing unit for processing the receive signal; and a signal detection unit that accepts the receive signal, includes a transition number detection circuit for detecting a number of transitions of a signal obtained based on the receive signal and outputs a signal for controlling an operation of the processing unit when the number of transitions detected by the transition number detection circuit is not more than a set value.

Alternatively, the receiver circuit of this invention for receiving a receive signal that undergoes a given number or more transitions in a given time, includes a processing unit for processing the receive signal; and a signal detection unit that accepts the receive signal, includes an amplitude detection circuit for detecting amplitude of the receive signal and outputs a signal for controlling an operation of the processing unit when the amplitude detected by the amplitude detection circuit is not more than a set value.

In one aspect of the receiver circuit of this invention, the receive signal is a data signal or a clock signal.

In another aspect of the receiver circuit of this invention, the receive signal is a data signal and a clock signal received through a cable in which a plurality of transfer paths are integrated, and one of the data signal and the clock signal is input to the signal detection unit.

In one aspect of the receiver circuit of this invention, the amplitude detection circuit includes an offset buffer that accepts the receive signal and outputs a HIGH or LOW signal when the amplitude of the receive signal is not more than a set value.

In one aspect of the receiver circuit of this invention, the signal detection unit includes a set value change circuit for changing the set value of the offset buffer.

In one aspect of the receiver circuit of this invention, the set value is changed by the set value change circuit on the basis of data stored in an externally readable and writable resistor.

In another aspect, the receiver circuit of this invention further includes an offset buffer that accepts the receive signal and outputs a HIGH or LOW signal when amplitude of the receive signal is not more than a set value, and the HIGH or LOW signal output by the offset buffer is input to the transition number detection circuit as the signal obtained based on the receive signal.

In one aspect of the receiver circuit of this invention, the processing unit is a data processing unit for processing a data signal received as the receive signal and is reset in accordance with the signal output by the signal detection unit.

In another aspect of the receiver circuit of this invention, the processing unit is a data processing unit for processing a data signal received as the receive signal and is power-down operated in accordance with the signal output by the signal detection unit.

Therefore, according to the invention, in the state where a cable has come off, the number of transitions or the amplitude of the receive signal detected in the signal detection unit is not more than the set value, and therefore, the signal is output from the signal detection unit to the data processing unit, so as to control the data processing unit.

Accordingly, there is no need to provide a pull-up resistor and a pull-down resistor that are conventionally provided to the input terminals of a receiver circuit for realizing the fail safe function, and hence, the area of the receiver circuit can be reduced. In addition, the present receiver circuit can be free from a steady-state current conventionally consumed through these resistors, and therefore, the disconnection state where a cable has come off can be detected with low power consumption. In particular, in a system having a large number of data channels, the steady-state current can be reduced with respect to each channel, resulting in reducing the power consumption in the whole circuit and the whole system.

Also, in this invention, the transfer paths for the data signal and the clock signal to be input to the signal detection unit are integrated in one cable, and therefore, the disconnection state of the cable can be definitely detected by detecting the number of transitions or the amplitude of merely one of these signals. Accordingly, in the case where the number of transitions or the like of the clock signal is detected, there is no need to restrict the number of transitions of the data signal.

Furthermore, according to the invention, in the case where the cable has come off and hence the line for the receive signal is placed in a high-impedance state, even when noise appears on this signal line, the output signal of the offset buffer can be fixed to HIGH or LOW level because the amplitude of the noise is not more than the set value. Accordingly, identification of noise as error in detecting the disconnection state of the cable can be avoided. Thus, the fail safe function can be realized while attaining both the improvement of the noise resistance and the low power consumption.

Moreover, according to the invention, the set value of the offset buffer can be changed by the set value change circuit. Therefore, the noise resistance can be changed by changing the level for detecting noise in accordance with the amplitude of noise varied depending upon an employed application, and thus, the degree of freedom in design can be increased.

According to the invention, in the state where the cable has come off, the number of transitions of the receive signal is generally not more than the set value, and hence, the operation of the data processing unit is controlled by the signal detection unit. Even when noise is caused in the signal detection unit, the number of transitions of the noise is not more than the set value and hence the output of the offset buffer is fixed to HIGH or LOW level. Therefore, the number of transitions of the signal input to the transition number detection circuit can be definitely not more than the set value, so that a normal fail safe function can be always realized.

Furthermore, according to the invention, when there arises a disconnection state where the cable has come off, the data processing unit is reset in accordance with the signal output from the signal detection unit. Accordingly, all outputs from the data processing unit can be fixed to LOW or HIGH level. Therefore, for example, in a transmitter/receiver system for video signals, if there arises a disconnection state where a cable has come off, the displayed image is in a single color, and hence, a user can easily visually find that the cable has come off.

Moreover, according to the invention, when there arises a disconnection state where the cable has come off, the data processing unit is power-down operated in accordance with the signal output front the signal detection unit. Accordingly, a current passing in the disconnection state where the cable has come off can be controlled, so as to realize low power consumption and power control when the fail safe function is exhibited.

DETAILED DESCRIPTION OF THE INVENTION

Receiver circuits according to preferred embodiments of the invention will now be described with reference to the accompanying drawings.

Embodiment 1

Figure 1:
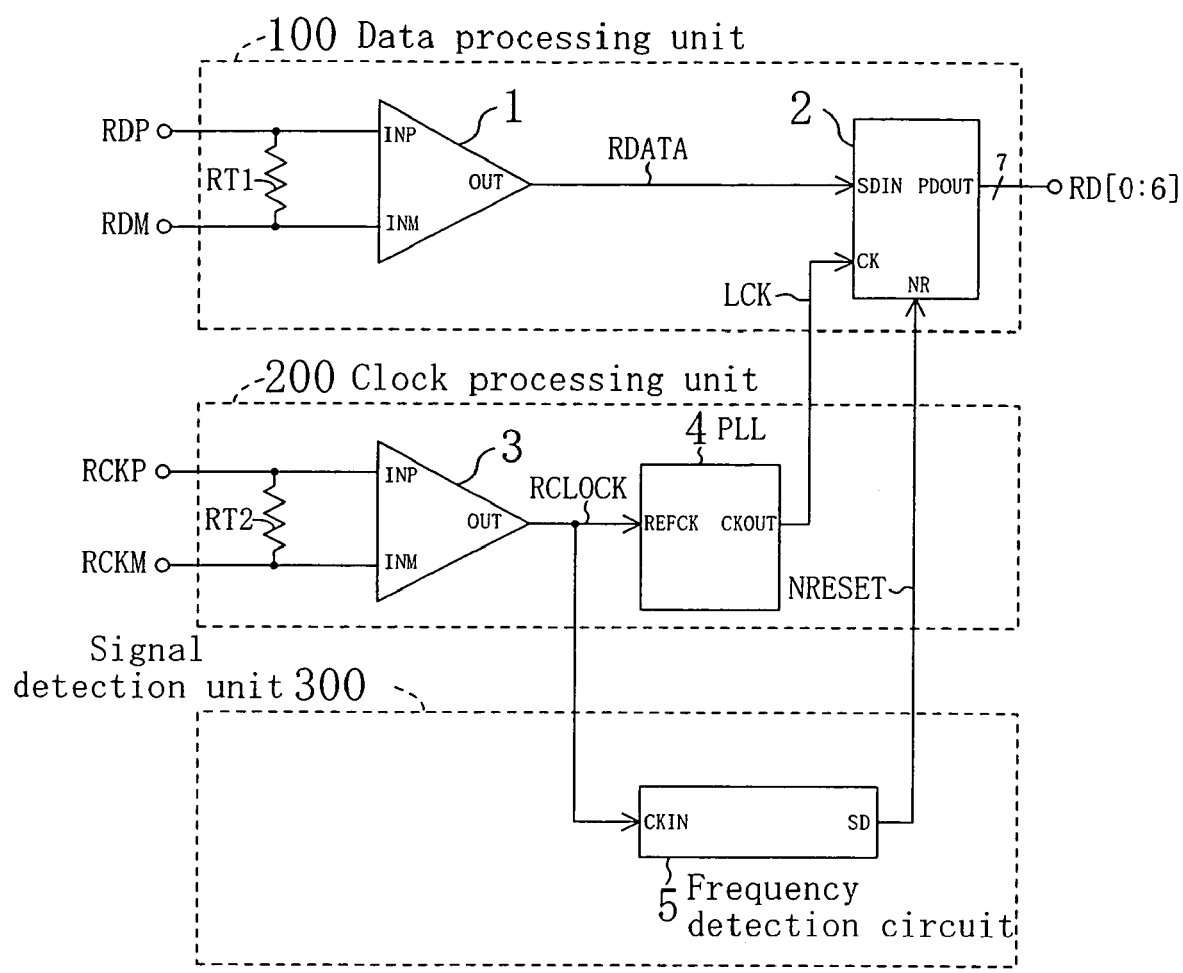
FIG. 1 is a circuit diagram of a receiver circuit according to Embodiment 1 of the invention.

FIG. 1 is a circuit diagram of a receiver circuit according to Embodiment 1 of the invention. This receiver circuit includes a data processing unit (processing unit) 100, a clock processing unit (processing unit) 200 and a signal detection unit 300.

Figure 2:
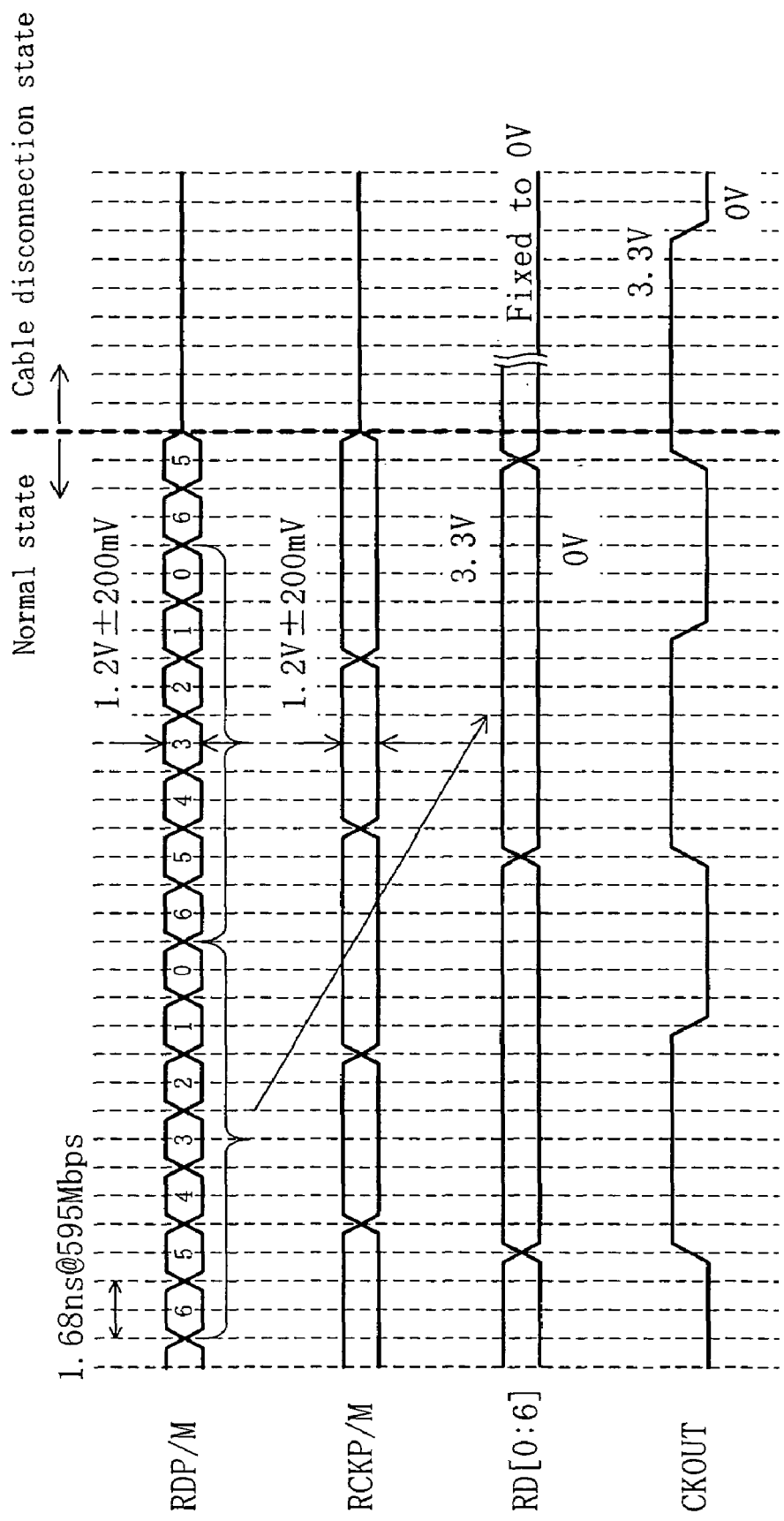
FIG. 2 is a timing chart of the receiver circuit of FIG. 1.

The data processing unit 100 includes an input buffer 1 and a 1:7 serial-parallel converter circuit 2. This data processing unit 100 accepts, at the input buffer 1, differential data signals with small amplitude received at small amplitude differential data input terminals RDP and RDM of the receiver circuit (which signals are hereinafter referred to as the data input signals RDP and RDM), converts the data input signals into a signal at a CMOS amplitude level, for example, into a serial data signal RDATA with amplitude of 3.3 V, and outputs the serial data signal. A terminating resistor RT1 is connected between two input terminals INP and INM of the input buffer 1. In this embodiment, the terminating resistance is, for example, 100 Ω, and the differential data signals RDP/M with the small amplitude are, for example, signals of a frequency of 595 Mbps and amplitude of 1.2 V±200 mV as shown in FIG. 2. The output terminal of the input buffer 1 is connected to a SDIN terminal of the 1:7 serial-parallel converter circuit 2 for converting the serial data signal RDATA output from the input buffer 1 into parallel data. In this case, the data transfer rate per second of the serial data signal RDATA is expressed as 595 Mbps×1 bit. The converted parallel data signal is output from an output terminal PDOUT of the 1:7 serial-parallel converter circuit 2 to an output terminal RD[0:6] of the receiver circuit. At this point, the data transfer rate per second is expressed as 85 Mbps×7 bits.

The clock processing unit 200 includes an input buffer 3 and a multiphase PLL circuit 4. This clock processing unit 200 accepts, at the input buffer 3, differential clock signals with small amplitude received from small amplitude differential clock input terminals RCKP and RCKM of the receiver circuit (which signals are hereinafter referred to as the clock input signals RCKP and RCKM) and outputs an output signal RCLOCK. A terminating resistor RT2 is connected between the two input terminals INP and INM of the input buffer 3. In this embodiment, the terminating resistance is, for example, 100 Ω, and the clock input signals RCKP/M are, for example, signals of a frequency of 85 MHz and amplitude of 1.2 V±200 mV as shown in FIG. 2. The output signal RCLOCK output from the input buffer 3 is input to an input terminal REFCK of the multiphase PLL circuit 4 for adjusting the frequency and the phase thereof. Then, a clock signal LCK whose frequency and phase have been adjusted by the multiphase PLL circuit 4 is output from an output terminal CKOUT. This clock signal LCK is input to a clock input terminal CK of the 1:7 serial-parallel converter circuit 2 in order to obtain synchronization with a sender side in the serial-parallel conversion of the data signal in the 1:7 serial-parallel converter circuit 2 of the data processing unit 100.

The signal detection unit 300 includes a frequency detection circuit (transition number detection circuit) 5. The input terminal CKIN of the frequency detection circuit 5 is supplied with the output signal RCLOCK of the input buffer 3 of the clock processing unit 200, so that the number of transitions of the signal RCLOCK occurring within a predetermined time can be detected in the frequency detection circuit 5. When the number of transitions is not more than a predetermined set value, a reset signal NRESET is output from the output terminal SD. This reset signal NRESET is input to a reset signal input terminal NR of the 1:7 serial-parallel converter circuit 2 of the data processing unit 100, so as to reset the output of the data signal received by the receiver circuit. When, however, the number of transitions of the signal RCLOCK detected within the predetermined time exceeds the set value, the reset signal is not output, and hence, the operation of the data processing unit 100 is not disturbed.

Now, the operation of the receiver circuit of this embodiment will be described. First, in the case where the frequency of the input signal CKIN of the frequency detection circuit 5 is 20 kHz or more, namely, in the case where a cable is connected to the clock input terminals RCKP/M for inputting the clock signals, the output terminal SD of the frequency detection circuit 5 is at H level (SD=H), and therefore, the reset signal input terminal NR of the 1:7 serial-parallel converter circuit 2 is at H level, so that the 1:7 serial-parallel converter circuit 2 can be normally operated.

In contrast, in the case where the frequency of the input signal CKIN of the frequency detection circuit 5 is not more than 20 kHz, namely, the cable has come off and is disconnected, the output terminal SD of the frequency detection circuit 5 is at L level (SD=L), and therefore, the reset signal input terminal NR of the 1:7 serial-parallel converter circuit 2 is at L level. Accordingly, the reset signal is input to the 1:7 serial-parallel converter circuit 2, and hence, the output data RD[0:6] is fixed to L level, so as to realize the fail safe function.

Accordingly, in this embodiment, there is no need to provide the pull-up resistors and the pull-down resistors that are conventionally provided in the data processing unit and the clock processing unit, and since the fail safe function can be thus realized with a simple architecture, area reduction and low power consumption can be both attained. Also, since a consumed current necessary for realizing the fail safe function can be reduced, the power consumption of the whole system can be reduced. In particular, when the system has a large number of data channels, the effect to reduce the power consumption is remarkably exhibited.

In the receiver circuit of this embodiment, in the case where the data signals and the clock signals are input, the signal RCLOCK obtained based on the clock signals is input to the signal detection unit 300. Instead, the signal RDATA obtained based on the data signals alone may be input to the signal detection unit 300. Alternatively, needless to say, in the case where the data signals alone are received, the data signals may be input to be detected in the signal detection unit 300.

Figure 7:
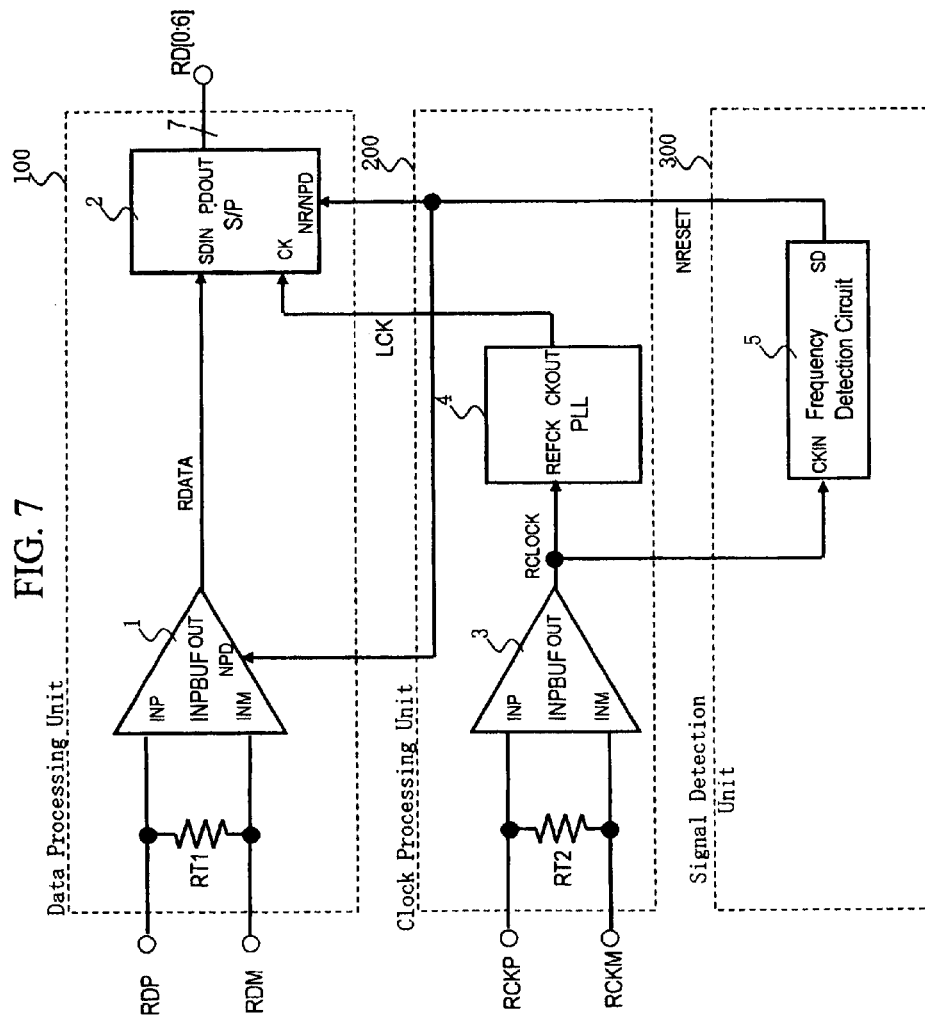
FIG. 7 is a circuit diagram of a modified receiver circuit according to Embodiment 1 of the invention.

Also, in this embodiment, the reset signal to be output to the data processing unit 100 is controlled on the basis of the number of transitions of the signal detected in the signal detection unit 300, so as to restrict (control to reset) the operation of the data processing unit 100. In the case where the data processing unit 100 has a power down signal input terminal NPD (the input buffer 1 and the serial-parallel converter circuit 2 each have the power down signal input terminal NPD), the output signal from the signal detection unit 300 can be input as a power down signal to the power down signal input terminal NPD so as to power-down control the operation of the data processing unit 100, as shown in FIG. 7.

Embodiment 2

A receiver circuit according to Embodiment 2 of the invention will now be described with reference to FIG. 3. In this embodiment, in the case where a cable has come off and hence clock input signals RCKP/M are placed in a high-impedance state (i.e., Hi-Z state), even when noise appears on the clock signal input lines RCKP/M, the noise is prevented from being detected as a signal in error. In this embodiment, like reference numerals are used to refer to like elements used in Embodiment 1 so as to omit the description.

Figure 3:
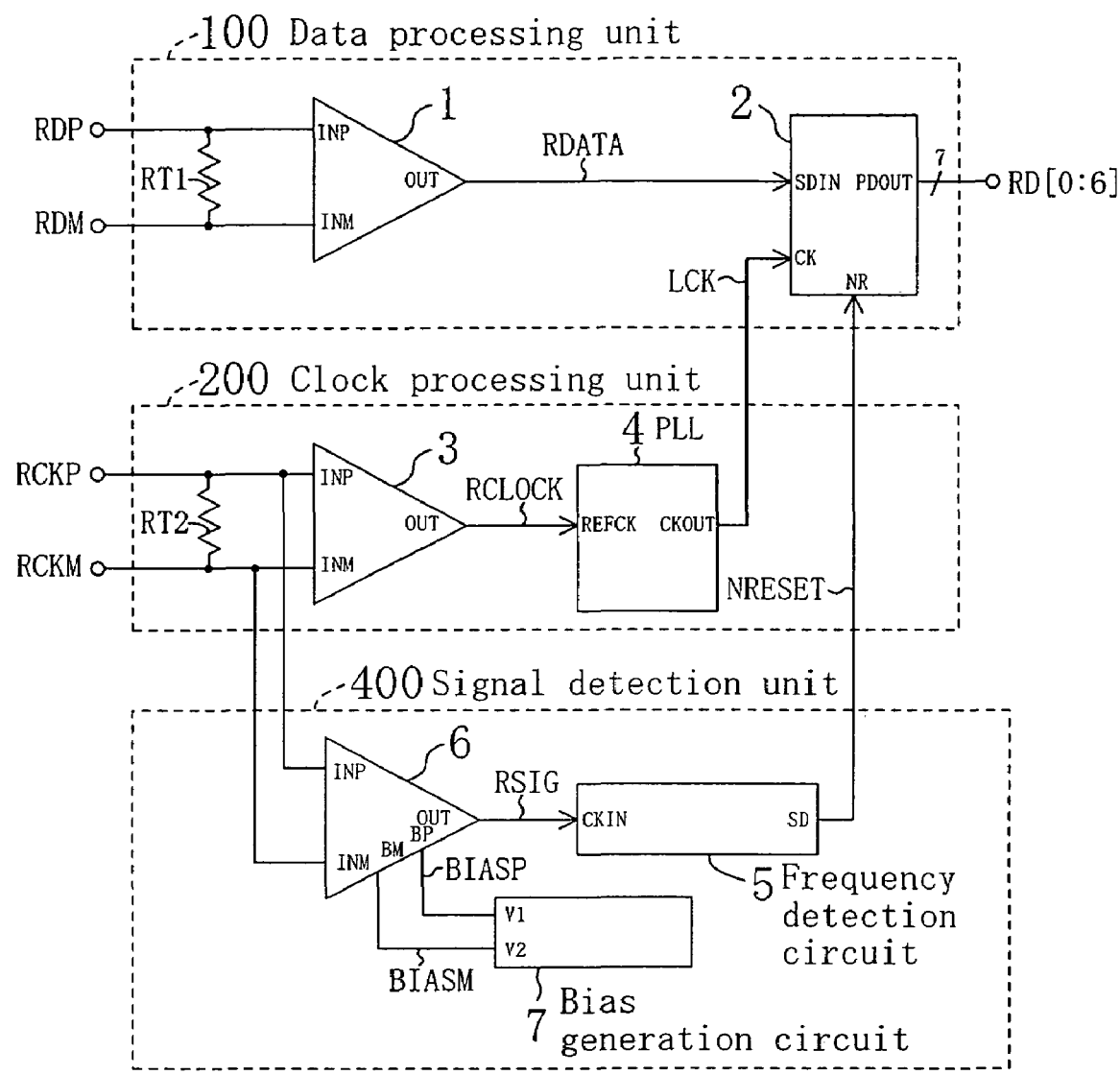
FIG. 3 is a circuit diagram of a receiver circuit according to Embodiment 2 of the invention.

The receiver circuit of FIG. 3 includes a data processing unit 100, a clock processing unit 200 and a signal detection unit 400.

The receiver circuit of this embodiment is different from that of Embodiment 1 shown in FIG. 1 in the configuration of the signal detection unit. Specifically, although the signal detection unit 300 of the receiver circuit of FIG. 1 includes the frequency detection circuit 5 alone, the signal detection unit 400 of this receiver circuit additionally includes an offset buffer 6 and a bias generation circuit 7.

In the signal detection unit 400 of FIG. 3, in order to detect the number of transitions occurring within a predetermined time in the frequency detection circuit 5, clock input signals RCKP/M received by the offset buffer 6 are first converted into a single signal RSIG of a CMOS amplitude level by the offset buffer 6. At this point, the offset buffer 6 receives bias voltages BIASP and BIASM output by the bias generation circuit 7 and compares a set value Vth (which is also designated as an offset value) defined as Vth=|BIASP−BIASM| with the amplitude of the signal RSIG. When the amplitude of the signal RSIG is not more than the set value Vth, the offset buffer 6 fixes the output signal RSIG to LOW level or HIGH level and outputs the fixed LOW or HIGH level signal. In contrast, when the amplitude exceeds the set value Vth, the offset buffer 6 directly outputs the clock input signal RCKP/M as the output signal RSIG. This output signal RSIG is input to the frequency detection circuit 5.

In this embodiment, the set value Vth is set to, for example, 50 mV. Also, the bias generation circuit 7 is a circuit that can easily generate a bias voltage through resistance potential division, and the values of the bias voltages BIASP and BIASM are, for example, 1.225 V (=1.2 V+25 mV) and 1.175 V (=1.2 V−25 mV), respectively.

In this manner, in the case where the signal detection unit 400 includes the offset buffer 6 and the frequency detection circuit 5, even if noise appears when the cable has come off and the clock input terminals RCKP/M are placed in the Hi-Z state, the fail safe function can be normally realized without error detection of the noise. Accordingly, the fail safe function can be realized while attaining both of the improvement of the noise resistance and the low power consumption.

Also in this embodiment, the operation for resetting the data processing unit 100 is controlled on the basis of the number of transitions of the output signal RSIG of the offset buffer 6 occurring in the predetermined time in the signal detection unit 400. Instead, in the case where the data processing unit 100 has a power down signal input terminal, a power down signal can be input to this power down signal input terminal, so as to power-down control the data processing unit 100 (see FIG. 7).

Embodiment 3

Figure 4:
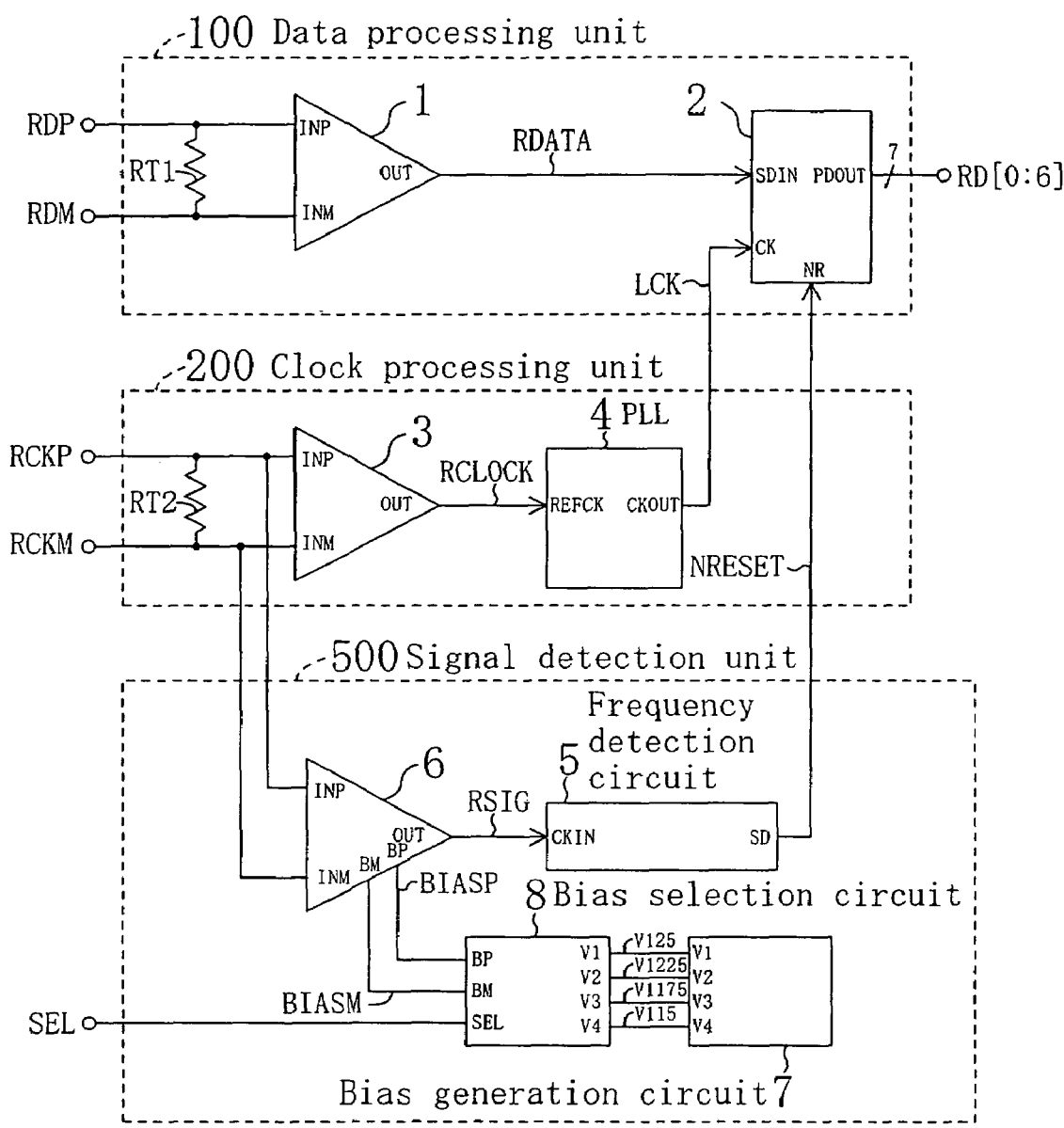
FIG. 4 is a circuit diagram of a receiver circuit according to Embodiment 3 of the invention.

FIG. 4 shows a receiver circuit of Embodiment 3 of the invention.

This receiver circuit includes a data processing unit 100, a clock processing unit 200 and a signal detection unit 500. This receiver circuit is different from the receiver circuit of Embodiment 2 shown in FIG. 3 in the configuration of the signal detection unit. Specifically, the signal detection unit 500 of this embodiment is obtained by additionally providing, to the signal detection unit 400 of FIG. 3, a bias selection circuit (set value change circuit) 8 having a set value change terminal SEL for changing the set value Vth of the offset buffer 6.

The bias selection circuit 8 is connected to the bias generation circuit 7, receives a plurality of different bias voltages output by the bias generation circuit 8 and outputs two of these plural bias voltages to bias voltage input terminals BP and BM of the offset buffer 6. At this point, the two bias voltages output by the bias selection circuit 8 are selected on the basis of a signal input to the set value change terminal SEL. It is noted that the offset buffer 6 and the frequency detection circuit 5 of the signal detection unit 500 have the same configurations and the same functions as those of the signal detection unit 400 of the receiver circuit of Embodiment 2 shown in FIG. 3.

In this embodiment, the bias generation circuit 7 outputs four different bias voltages V1, V2, V3 and V4. When the set value change terminal SEL has a value at H level, the bias selection circuit 8 selects the bias voltages V1 and V4 for the input terminals BP and BM, respectively, and when the set value change terminal SEL has a value at L level, the bias selection circuit 8 selects the bias voltages V2 and V3 for the input terminals BP and BM, respectively. In this case, the four bias voltages V1, V2, V3 and V4 are set to, for example, 1.25 V, 1.225 V, 1.175 V and 1.15V, respectively. Therefore, the offset voltage of the offset buffer 6 can be switched between 100 mV and 50 mV through the selection based on the set value change terminal SEL.

In this manner, the offset value for preventing the error detection of noise as a signal can be selected in accordance with the quantity of noise caused in an employed application, and therefore, the degree of freedom in design can be increased.

In this embodiment, the reset signal NRESET is output to the data processing unit 100 when the number of transitions occurring in the predetermined time of the output signal RSIG of the offset buffer 6 of the signal detection unit 500 detected by the frequency detection circuit 5 is not more than the given set value, so as to control to reset the operation of the data processing unit 100. Instead, in the same manner as described in Embodiments 1 and 2, in the case where the data processing unit 100 has a power down signal input terminal, a power down signal can be used as the signal from the frequency detection circuit 5 to the data processing unit 100, so as to power-down control the operation of the data processing unit 100 (see FIG. 7).

Also, in order to control the operation of the data processing unit 100, the output of the offset buffer 6 can be controlled, with the frequency detection circuit 5 removed from the signal detection unit 500, so as to directly input, as a reset control signal, the output signal of the offset buffer 6 to the reset terminal NR of the 1:7 serial-parallel converter circuit 2. Thus, the fail safe function can be realized merely by detecting the amplitude and there is no need to detect the number of transitions.

Embodiment 4

Figure 5:
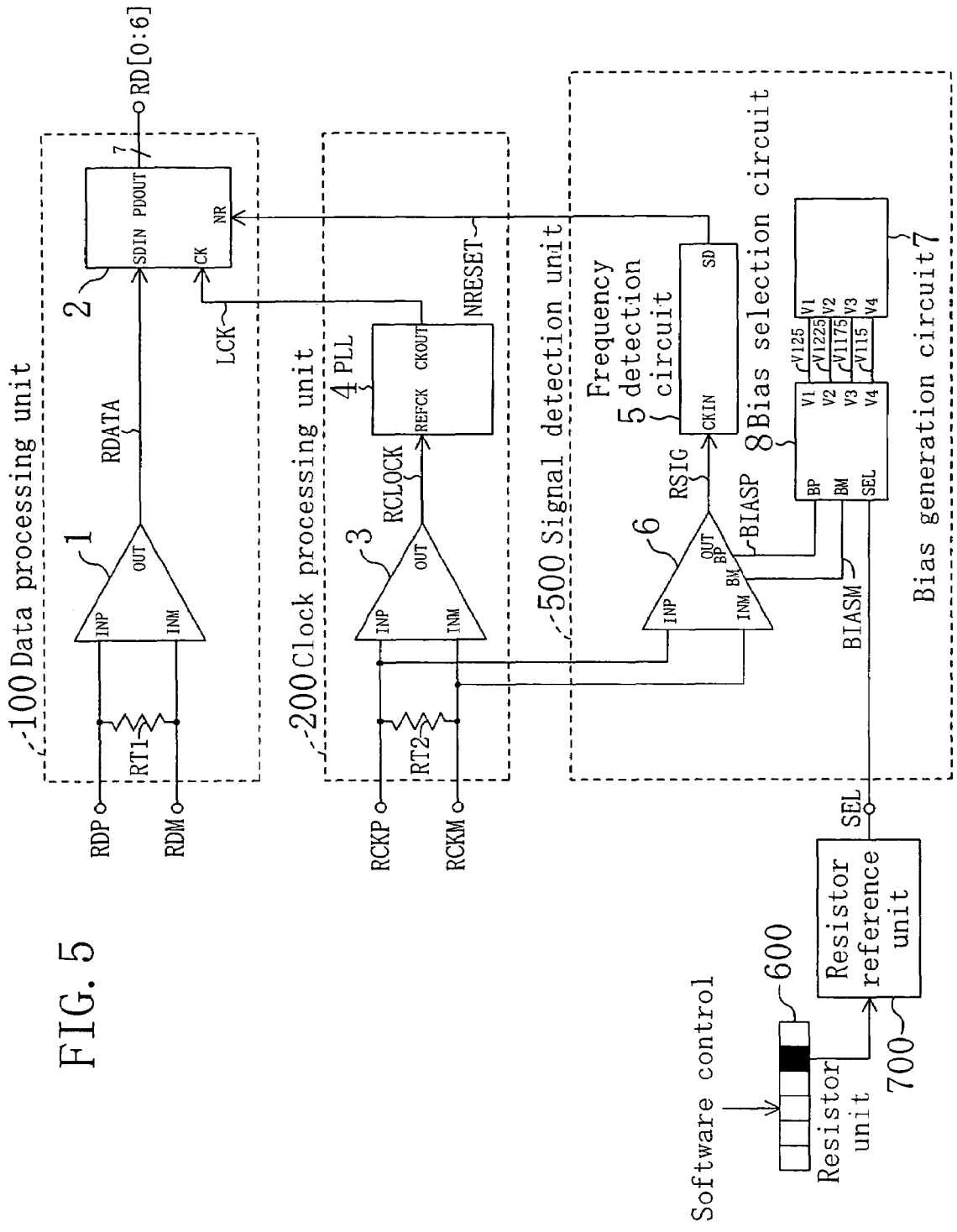
FIG. 5 is a circuit diagram of a receiver circuit according to Embodiment 4 of the invention.
Figure 6:
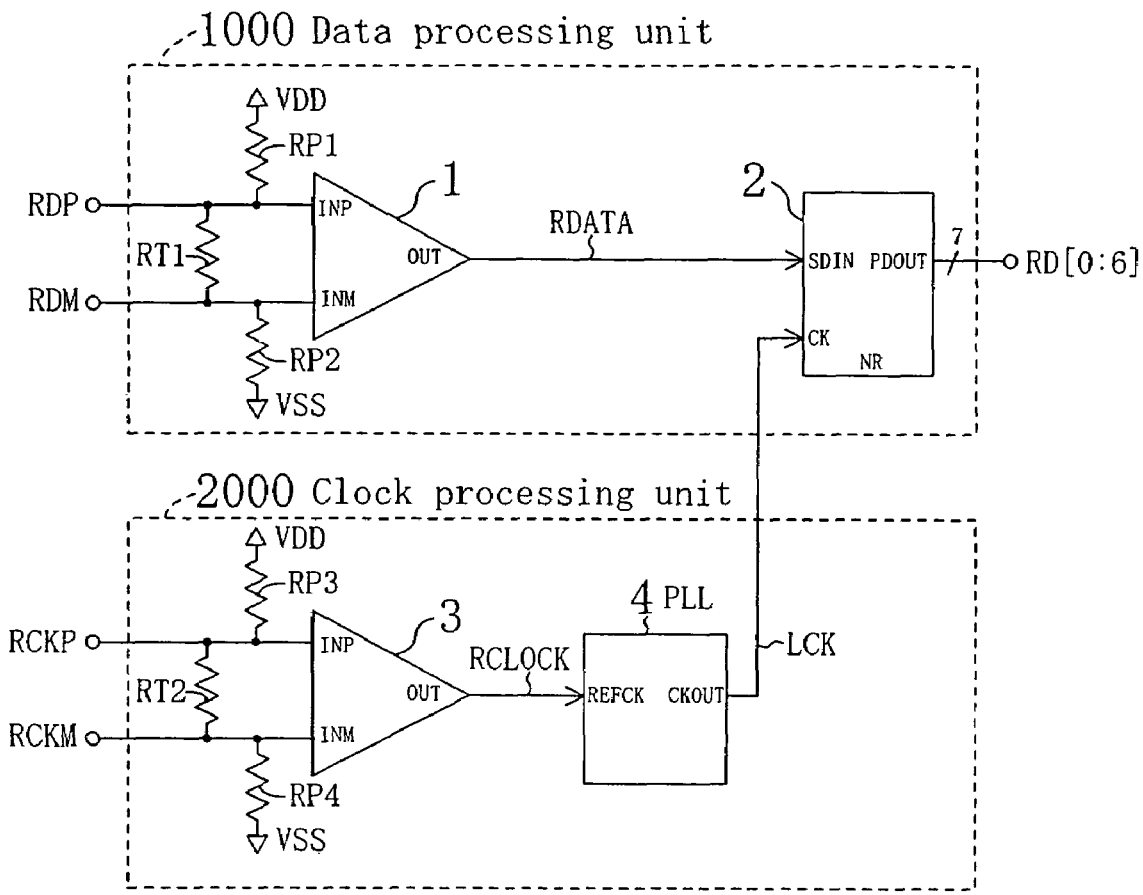
FIG. 6 is a circuit diagram of a conventional receiver circuit.

FIG. 5 shows a receiver circuit according to Embodiment 4 of the invention.

This receiver circuit includes a data processing unit 100, a clock signal processing unit 200, a signal detection unit 500, a resistor unit 600 and a resistor reference unit 700.

This receiver circuit is different from that of Embodiment 3 shown in FIG. 4 in that the input signal input to the set value change terminal SEL of the bias selection circuit 8 is specifically an output signal output from the resistor reference unit 700. The resistor reference unit 700 refers binary data stored in a specific bit of resistors of the resistor unit 600, and a signal corresponding to the referred data is supplied to the set value change terminal SEL, so as to change the offset voltage value (set value) Vth. The data in the resistors can be externally read and written, and hence, the address of a resistor in the resistor unit 600 can be specified by using software so as to rewrite the content of the specified resistor. In other words, the noise resistance can be selected by using software.

Also in this embodiment, in the same manner as described in Embodiments 1 through 3, in the case where the data processing unit 100 has a power down signal input terminal, a power down signal can be output as the output signal of the frequency detection circuit 5 instead of the reset signal, so as to control the operation of the data processing unit 100 (see FIG. 7).

Furthermore, as described in Embodiment 3, the frequency detection circuit 5 may be removed from the signal detection unit 500 for controlling the operation of the data processing unit 100.

What is claimed is:

1. A receiver circuit for receiving a receive signal that undergoes a given number or more transitions in a given time, comprising:
    a PLL circuit for generating a clock signal for processing the receive signal;
    a processing unit for processing said receive signal; and
    a signal detection unit that accepts said receive signal, and that includes a transition number detection circuit for detecting a number of transitions of a signal obtained based on said receive signal, and for classifying the number of transitions to plural set of regions which are related to a range of transition numbers and outputs a signal for controlling an operation of said processing unit based on the classified region, wherein said receive signal is a data signal and a clock signal received through a cable in which a plurality of transfer paths are integrated, and one of said data signal and said clock signal received through a cable is input to said signal detection unit.

2. A receiver circuit of claim 1, wherein the signal detection unit controls the PLL circuit.

3. A receiver circuit of claim 2, wherein the signal detection unit controls the PLL circuit to stop the output of the PLL circuit.

4. A receiver circuit of claim 2, wherein the signal detection unit controls a current which flows in a charge pump.

5. A receiver circuit of claim 2, wherein the signal detection unit controls a gain of a VCO.

6. A receiver circuit of claim 2, wherein the signal detection unit controls a value of resistance or a value of capacitance of a filter of the PLL circuit.

7. A receiver circuit of claim 1, wherein the signal detection unit controls an input buffer.

8. A receiver circuit of claim 7, wherein the signal detection unit controls a current which flows in the input buffer.

9. A receiver circuit of claim 1, wherein the clock which is input to the signal detection unit is a single clock.

* * * * *